United States Patent [19]

Albano et al.

[11] 3,946,710
[45] Mar. 30, 1976

[54] SUPPLEMENTAL AIR VALVES AND SUPPLEMENTAL AIR SYSTEMS FOR INTERNAL COMBUSTION ENGINES

[75] Inventors: Joseph L. Albano, Irvine; Hugh H. Harren, Anaheim, both of Calif.

[73] Assignee: Albano Enterprises, Inc., Santa Ana, Calif.

[22] Filed: Mar. 20, 1972

[21] Appl. No.: 236,013

[52] U.S. Cl........... 123/119 B; 123/119 D; 137/517
[51] Int. Cl.² ....................... F02B 33/00; F02M 7/00
[58] Field of Search ........ 123/119 B, 119 D, 124 R; 137/517

[56] References Cited
UNITED STATES PATENTS

| | | | |
|---|---|---|---|
| 2,454,480 | 11/1948 | Rossman | 137/517 |
| 3,042,926 | 7/1962 | Shepard | 137/517 |
| 3,087,474 | 4/1963 | Catha | 123/119 B |
| 3,176,670 | 4/1965 | Sinibaldi | 123/119 B |
| 3,412,752 | 11/1968 | Gordon et al. | 123/119 D |
| 3,550,570 | 12/1970 | Watson | 123/119 B |

Primary Examiner—Charles J. Myhre
Assistant Examiner—Ronald B. Cox
Attorney, Agent, or Firm—Grover A. Frater

[57] ABSTRACT

Engine performance is improved and nitrogen compound emission is reduced by introducing supplemental air to the intake manifold of an internal combustion engine which is fitted with a PCV valve. The supplemental air inlet device is connected so that it introduces air into the line between the PCV valve and the intake manifold. That line connects to the manifold immediately downstream from the carburetor at a special adaptor. The supplemental air inlet valve is specially constructed to utilize frictional forces arising out of air flow past the valve head, Venturi effect as the head nears closure, and finally pressure sealing at complete closure of the valve, in an efficient but low-cost design. The supplemental air valve is operated at a temperature, and supplemental air is introduced in a way, that results in condensation on its inner walls of oil vapors drawn through the PCV valve so that the condensed oil entraps particles of foreign matter that find their way through the supplemental air valve.

5 Claims, 6 Drawing Figures

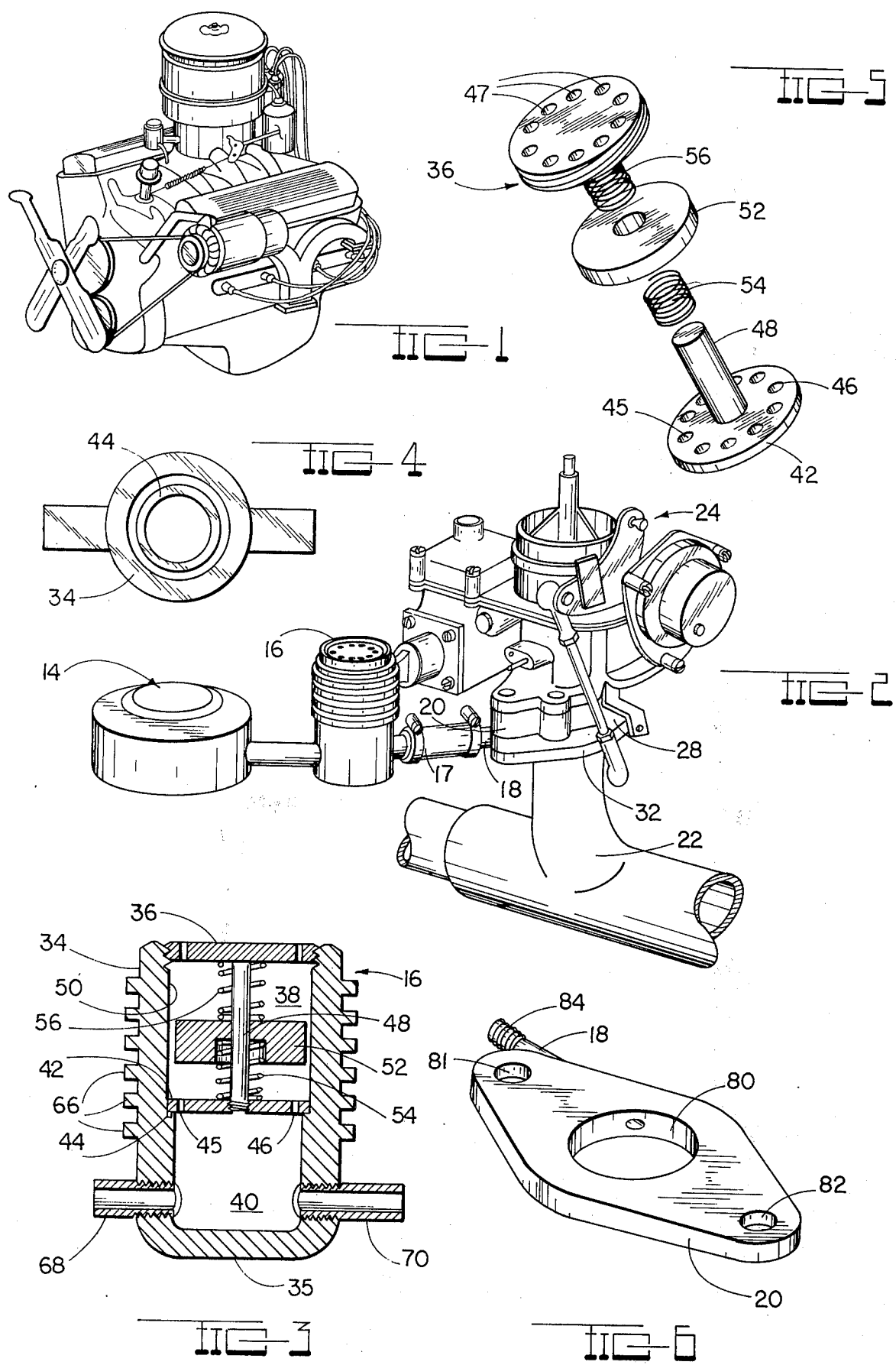

SUPPLEMENTAL AIR VALVES AND SUPPLEMENTAL AIR SYSTEMS FOR INTERNAL COMBUSTION ENGINES

Internal combustion engines and piston-type gasoline engines in particular are arranged so that downward movement of a piston within its cylinder results in reduction of cylinder pressure below atmospheric pressure. That negative pressure, or vacuum, is used to draw fuel into the cylinder. The fuel is a mixture of gasoline, or other hydrocarbon, and air. Customarily, a single mixing unit, called a carburetor, is employed notwithstanding that the engine includes a number of cylinders. In that case the output of the carburetor is applied to a piping system called an intake manifold which connects to all of the cylinders in parallel. During engine operation the pressure within the manifold is negative and its magnitude is referred to in positive terms as the "amount of vacuum". Because of increased carburetor opening at higher speeds and several other factors, the amount of vacuum measured at the intake manifold varies inversely with engine speed. In a typical case the vacuum may equal twenty inches of mercury during engine start-up and be diminished to one and one-half inches of mercury at maximum usable speed. The carburetor performs several functions. It is required to mix hydrocarbon fuel and air and to deliver to the intake manifold a quantity of mixed fuel that varies with required power output. In addition, the carburetor is employed to adjust the ratio of air to hydrocarbon fuel for different operating conditions. The number of variables and the range of variables that must be taken into account in the design of a carburetor have necessitated compromises, the effect of which has been less than optimum efficiency in certain operating conditions and the production of pollutants in the exhaust products of engine operation.

Experimenters have found, and it is now well-known, that engine efficiency can be increased and the generation of pollutants decreased by admitting air to the input manifold to supplement the air in the air hydrocarbon fuel mixture. At optimum condition the volume of added air is minimum at low engine speed and maximum at high engine speed. Employing a separate valve for admitting that additional air has proven to be more efficient than have attempts to redesign carburetion devices to achieve a similar air flow compensation.

Two forms of supplemental air input valves have been employed. Older systems simply add a valve in parallel with the carburetor to draw in outside air. That expedient worked well and the design of such supplemental air input valves proved to be relatively non-critical. However, attempts to reduce generation of pollutants have lead to the incorporation of positive crankcase ventilation valves which draw air and fumes from the crankcase of the engine at a rate that varies directly with the pressure differential between the engine crankcase and input manifold and then introduce them into the input manifold. PCV valves are spring-closed valves which open in proportion to the pressure differential across them. That pressure differential is highest at low engine speeds and is lowest at high engine speeds. This is the reverse of the effect that is desired and that is intended to be produced by addition of a supplemental air valve. Newly developed carburetors accomplish some compensation but the need still exists to add supplemental air at high engine speeds. Moreover, it is still valid, both from a cost and a functional standpoint, to introduce that supplemental air through a structure separate from the carburetor and to introduce it at a point just downstream from the carburetor. The design of that valve has been made more difficult, however, by the addition of the PCV valve.

Use of PCV valves is generally mandatory now and addition of the supplemental air inlet valve cannot be permitted to degrade the anti-pollution characteristics of the system. Consequently, operation of the PCV valve cannot be permitted to change materially by addition of the supplemental air inlet valve. Instead, the latter must be designed to furnish less supplemental air at low speeds without change of air input at high speeds. It must be more sensitive to pressure differential and it must respond faster than the older air inlet valves. The advent of the PCV valve in the engine system signalled the appearance of some new supplemental air inlet valve designs, some of them radical departures from the old. One of the objects of this invention is to preserve some of the desirable attributes of the earlier valve while making a number of changes to provide the required modified and improved performance. Another object is to enhance system reliability while reducing some of the manufacturing costs. Some of the changes in the valve are quite subtle but important nonetheless, and they are combined with system changes to produce a result that aids materially in reducing certain of the components of pollution which the PCV valve is not particularly effective to reduce. More particularly, the combination of PCV valve and supplemental air inlet valve, in the system provided by the invention, serves to reduce nitrogen compounds as well as hydrocarbon compounds in the exhaust emissions of the engine.

The supplemental air valve provided by the invention employs an improved seat construction offering reduced resistance to flow downstream from the valve proper. At the same time, the seat construction discourages laminar flow through the valve whereby there is turbulence produced in a cavity downstream from the valve itself. Hot crankcase gasses flow through that cavity where they tend to be cooled by the turbulent air so that oil vapors are condensed and coat the cavity walls. Any foreign matter entering through the supplemental air valve tends to be caught and trapped by that film. The turbulence aids in this action by increasing the possibility that the foreign matter will reach an oily surface where it can be entrapped.

Since engine power is a function of differential between input fuel temperature and temperatures within the cylinder, it is desirable to cool the crankcase gasses before admitting them to the input manifold. The inclusion in the system of the supplemental air inlet valve affords an opportunity for cooling and valves made according to the invention may employ materials and constructions that tend to dissipate heat efficiently and the embodiments selected for illustration in the drawings have those attributes.

The supplemental air inlet valve is required to close as manifold vacuum increases. An initial closing action is accomplished by utilizing frictional forces arising out of air movement past the valve head. As the valve approaches closure, air velocity is greatly increased producing a Venturi effect which results in pressure differential in a direction to close the valve. Finally, the valve closes and is held sealed by pressure differential occasioned by the fact that the valve is subjected to atmospheric pressure upstream and to a vacuum downstream from the valve head. A spring biases the valve head open with a force that increases as closure is approached. The combination of bias spring and valve head mass produces an oscillatory system. A high ratio of resilience to mass is employed so that resonance is quite sharp. Both the resilience and mass have small value so that the resonant frequency is high. Damping for the system is provided by frictional force applied to the valve head by air moving past it. The flowpath is made long relative to the mass of the valve head so that the damping effect on valve closure is substantial. The arrangement insures damping on valve closure but not on valve opening.

One of the features that contributes to improved system performance is the use of an adaptor plate made of aluminum, or some aluminum-rich alloy, which is placed immediately below the carburetor in an engine that employs a carburetor body of aluminum or aluminum alloy and an inlet manifold of iron or steel. The adaptor serves as the entry point for crankcase gasses and supplemental air that are to be introduced into the inlet manifold. The adaptor admits the added fumes and air in a way that tends to make them flow around the outer circumference of the adaptor, cooling it. As a result the adaptor serves as a gasket (in conjuction with conventional gaskets) by introducing a degree of expansion and contraction that relates to expansion and contraction of the materials of the input manifold and carburetor such that a good seal is maintained at every engine temperature.

Understanding how these and other objects and advantages of the invention are accomplished will be facilitated by examination of the preferred embodiment illustrated in the accompanying drawings in which:

FIG. 1 is a pictorial view of an engine that has been provided with the system, including the supplemental air valve, provided by the invention;

FIG. 2 is a pictorial view of the system shown associated with a carburetor and a portion of an engine fuel inlet manifold;

FIG. 3 is a view in section taken on the vertical midplane of a supplemental air valve embodying the invention;

FIG. 4 is a view in top elevation of the body and inlet and outlet nipples of the apparatus shown in FIG. 3;

FIG. 5 is a pictorial view of several of the parts, shown exploded, that are employed in the valve of FIG. 3; and FIG. 6 is a pictorial view of the special adaptor.

The invention is applicable primarily to piston-type internal combustion engines that use gasoline as a fuel. One such engine is illustrated in FIG. 1. Each cylinder houses a piston which reciprocates along the cylinder during engine operation. Its several pistons are connected by connecting rods to a common crank. The crank is located in a lower housing which serves also as the sump or reservoir for lubricating oils that are pumped and otherwise circulated to the moving parts of the engine. That reservoir is called a crankcase. When a fuel element fails to burn completely so that it is combined with less oxygen than is chemically possible, it is discharged from the engine as a pollutant. One of the expedients currently being employed to promote complete combustion is to lower the pressure in the crankcase and to do this by withdrawing air and vapors, and those products of combustion that pass by the piston rings, and introducing them back into the fuel inlet system in an attempt to burn them along with new fuel. Incorporation of such a system degrades engine performance. For this and some other reasons the system incorporates a valve which permits maximum flow from the crankcase to the fuel input manifold at low speeds and reduces that flow as engine speed increases. That valve is called a positive crankcase ventilation valve or simply a PCV valve.

Crankcase pressure is higher than input manifold pressure. That pressure differential is used to open the PCV valve against a spring arranged to bias the valve closed. Many engines employ cam actuated valves for controlling the inlet and exhaust valves of the engine and the cam mechanism is covered by a rocker arm cover. The interior of that housing and the interior of the crankcase are interconnected by a conduit or by an opening through the engine block so that the connection from the crankcase to the PCV valve can be made through the cover. The PCV valve usually is mounted directly on the rocker arm cover. It has an inlet fitting that communicates with the interior of that cover and utimately communicates with the crankcase. In FIG. 1 the crankcase is designated 12 and the cam housing is designated 13. The PCV valve 14 hidden from view in FIG. 1 but visible in FIG. 2, is connected by a nonmetallic conduit or hose 15 to the inlet nipple of the supplemental air inlet device 16. An output conduit for hose 17 connects the supplemental air inlet device to the inlet fitting 18 of the manifold inlet adaptor 20. That adaptor is connected between the inlet manifold 22 of the engine and the body 24 of the carburetor 26, the lower portion 28 of which houses a mixing chamber in which fuel and air are combined just prior to emerging from the carburetor.

The inlet 30 of the PCV valve 14 is a fitting by which the valve can be attached to the rocker arm housing of the engine. The non-metallic conduit 15 is made of a flexible material, such as rubber or a synthetic elastomer, which can be bent to make installation easy and which is a poor conductor of heat whereby to minimize the transferance by conduction of heat from the PCV valve to the supplemental air inlet valve 16. The connection from the PCV valve leads to an outlet chamber at the lower end of the valve 16. The outlet from the valve leads from the same chamber through another non-metallic conduit 17 to the inlet fitting 18 of adaptor 20. Again, the non-metallic output conduit is used to simplify installation and to minimize conduction of heat between the valve 16 and the adaptor 20. The adaptor fits between the lower end 28 of a carburetor 24 and the upper flange 32 of the inlet manifold 22.

The construction of the supplemental air inlet valve is shown in FIGS. 3, 4 and 5. It includes a housing 34 and in this case the housing is cylindrical. Its lower end is closed by an end wall 35. The inner wall at the upper end is threaded to receive the inlet cover plate 36. The large cavity formed when the cover 36 is in place is divided into an inlet cavity 38 and an outlet cavity 40 by a separator 42 whose margins rest upon a shoulder 44 at the point where the diameter of the inner wall changes from a large upper diameter to a reduced lower diameter. The upper face of that separator plate 42 serves as a valve seat. It is provided with a series of perforations arranged in a circle near its outer edge. Two of those perforations 45 and 46 are visible in FIG. 3. That they extend entirely around the partition is shown in FIG. 5.

These several perforations are all the same size and they are the same size as the several openings, like in number as well, of the cover plate 36. In the cover the openings are designated by the reference numeral 47.

The partition is provided with a central, threaded opening and one end of a pin 48 is threaded securely in that opening so that in assembled condition the pin extends upwardly through the inlet chamber 38 along the axis of the unit. The cover plate 36 is assembled by being screwed into the upper opening of the housing 34 until its lower face bears against the upper end of the pin. By this expedient a force is applied through the pin to the partition plate 42 to hold the outer margins of the latter sealed against the shoulder 44. The partition has an outer diameter only slightly less than the diameter of the upper chamber wall 50 so that the partition and the pin are held against lateral movement.

The head of the supplemental air inlet valve is formed by a cylindrical disk 52. It has a hole bored through its center only slightly larger in diameter than the pin 48 so that the head will slide easily along the pin. The diameter of the head 52 is greater than the diameter of the circle on which the openings 45, and all of the other openings of the valve seat, are arranged so that those openings are sealed when the head 52 rests with its lower face against the upper face of the partition 42. The assembly also includes two springs 54 and 56. Both of those springs encircle the pin 48. Spring 54 is placed between the head 52 and seat 42 and the upper spring 56 is placed between head 52 and the cover plate 36. The design is such that the two springs can be alike and so that they are reversible end for end. This arrangement reduces the cost of manufacture and the number of unique parts. They are both compression springs. The lower one, 54, serves to bias the valve to open position. The valve 16 is installed so that the pin is oriented vertically, extending upward above the separated plate 42. In assembled condition the weight of the spring 56 and the weight of the head 52 combine to compress the spring 54 slightly. The upper spring 56 applies no resilient downward force because its length is such that it does not engage the cover plate 36 when the head 52 is at rest. The upper end of the spring 54 extends into a recess formed in the lower face of the valve head 52 and it is compressed into the recess as the valve closes. That recess 60 serves also to reduce the weight of the head 52. It also serves to reduce the length of the pin opening in the head. That is, it reduces the area of possible contact between the valve head 52 and pin 48 whereby to diminish friction and binding that could minimize the freedom with which the head is movable toward and away from the seat.

The recess being formed in the head is one of the significant features of the invention. It is the friction of air moving past the outer surfaces of the head 52 that supplies the force that results in initial movement of the head toward the seat. Development of an appreciable force requires that a large area of the head be subjected to that air flow. This is accomplished by making the head thicker. Forming the recess in the lower face of the head means that the valve can be thicker at its margin for a selected head weight. Obviously, the ratio of outer length to weight could be adjusted by other expedients such as cutting grooves in the upper and lower faces of the head but doing that adds manufacturing cost. The preferred embodiment employs the simple head structure shown in the drawings. That structure can be produced easily with a minimum number of operations on an ordinary screw machine.

The head is shown in full open position in FIG. 3. If the pressure in chamber 40 is reduced, the head will move downwardly and the valve will begin to close. That downward motion results from friction developed by air as it flows past the head. As a result of the friction, a pressure differential is developed across the head in a direction to urge the head against the bias of spring 54 toward contact with the upper face of the separator plate 42. As the head nears closure with the seat, so that the spacing between head and seat is less than the spacing between the outer wall of the head and the inner wall of the inlet chamber 50, then the air is accelerated and its velocity greatly increased whereby an aspiration effect is produced tending to pull the head down toward the seat. Finally, when contact is made, the head seals the openings 45 and 46 and all of the other openings of the seat. At this point the force holding the valve head down is equal to the pressure differential between inlet and outlet expressed in units of force per unit of area, times the combined area of the seat openings, less the force exerted by bias spring 54. While they tend to merge into one another, there are, nonetheless, three distinct origins of the forces that close the valve. Since the bias spring obeys Hooke's Law, the structural arrangement that accounts for the development of those three forces must be arranged so that the pressure times area force exceeds the aspirating force and such that the latter exceeds the force arising from pure resistance to air flow past the sides of the head. The aspirating force and the air flow resistance force depend upon air velocity for a given vacuum or suction pressure in outlet chamber 40. The resistance presented to air flow downstream from the valve becomes important and the structure that accounts for that resistance is important. In the invention the partition plate 42 is arranged to provide minimum resistance to flow. Ordinarily that would suggest large flow openings but the force with which the valve is maintained closed after complete closure depends upon the area of those flow openings and the force of the spring 54. However, initial valve closure force depends upon the bias of that spring 54 and the area of the sidewalls of the head and the spacing from those sidewalls to the inner wall of the valve body.

It is obvious then that there is an interrelationship between the mass of the head 52, the scale of spring 54, the surface area of the sidewalls of the head, the flow area between the head and body walls, the area of the seat openings, and the resistance to flow downstream from the valve. To reduce that downstream resistance, the separator plate 42 is made quite thin, half or less as thick as the head. That serves the additional purpose that flow through the seat openings is less laminar than it would be if those openings were long through a thick plate. Turbulence, as will be explained later, is useful in the lower cavity 40.

The advantage of the recess 60 in the head 52 in adjusting the surface area to weight ratio has been discussed above. The opposition to air flow past the valve head should be approximately the same as the opposition to flow through the openings of the seat. The fact that the surface area of the head past which air must flow is relatively large means that the area of the flow passageway can be larger than it otherwise would be. Moreover, the actual dimension of the head becomes less critical.

The vapors that are drawn from the crankcase are laden with oil and that oil can be made to condense on the inner wall of the outlet chamber of the valve 16 if the valve body can be maintained at a temperature materially below the temperature of those vapors as they arrive at the air valve. The valve body can be maintained at a substantially lower temperature in practice. The preferred embodiment employs a good heat conductor, aluminum, in making the valve body and the exterior of the body is formed with heat dissipating fins such as the fins 66. Once the lower chamber is coated with oil it can serve as a means for trapping small bits of foreign matter that enter through the air valve. Turbulence in the incoming air helps to accelerate those foreign particles so that they will impinge upon an oil-coated sidewall.

The upper spring 56 is employed only to insure that the head is returned rapidly to operating position if through vibration or otherwise it is moved upwardly. The only other elements of the preferred air valve are the two nipples 68 and 70 by which communication is had from the outlet chamber 40 to the PCV valve and to the adaptor 20 respectively.

In addition to these considerations that result the certain relativity in the sizes and shapes of the parts of the supplemental air inlet valve, the absolute size of those parts are also important because they need to introduce predetermined rates of supplemental air flow at different speeds and because the rate of flow is not linear with speed. In an installation in which vacuum is equal to about twenty inches of mercury at slow idle speed and 1 and ½ inches of mercury at high speed, the preferred supplemental air valve introduces a maximum air flow of about 1 and ½ cubic feet per minute and has the followig dimensions.

The inside diameter at the upper chamber or cavity 38 is 15/16 of an inch. The inside diameter of the lower chamber 40 is ⅞ of an inch. The partition plate 42 is ⅛ inch thick. It has ten perforations each 3/32 of an inch in diameter and arranged to form a circle ⅝ of an inch in diameter. Pin 48 extends ½ inch above the partition 42. The valve head is ¼ of an inch thick and ⅞ of an inch in diameter. The recess 60 extends half-way through the head. The two springs have a scale of 9 ounces per inch and are 3/16 of an inch long in relaxed condition. The head weighs 3.6 grams. The outlet cavity 40 is ¾ of an inch deep. The diameter of the openings through nipples 68 and 70 is ¼ inch.

The adaptor 20 is special in that it is made of aluminum or an aluminum alloy and in that its inlet opening is arranged so that air and vapors flowing through it are introduced into the circular inner cavity at a point off center whereby incoming air and vapor tends to circulate. It becomes thoroughly mixed with the output of the carburetor mixing chamber in a very short space to the end that that incoming material is uniformly distributed to the several cylinders. The adaptor is formed from a plate of uniform thickness. It has a central opening 80 which is aligned with the output opening of the carburetor and the input opening of the intake manifold when the adaptor is mounted between them. It is conventional to bolt the carburetor to the intake manifold and the adaptor 20 is provided with openings through which bolts of that kind can extend. This adaptor is arranged for incorporation in an arrangement that employs two mounting bolts and the mounting holes 81 and 82 are placed to align with corresponding openings in the carburetor and manifold. The input fitting 18 is provided with conformations 84 at its inlet end that facilitate its coupling to the hose 17. The other end of the fitting extends through the wall of the adaptor to an opening in the adaptor wall. The axis of that fitting is perpendicular to the direction of the axis of the main opening 80 of the adaptor. And the fitting axis has a direction so that it lies on one side of the axis of the main opening. Thus the gasses that are brought in at that fitting are brought in at one side of the opening such that they will be directed to circular movement by the opposite wall of the adaptor. When there is an appreciable flow of fuel from the carburetor then the air and fumes that are brought in at fitting 18 will be drawn down into the manifold inlet in a spiral motion. It is important that the air and fumes be introduced immediately after the carburetor to insure complete mixing in the short common section of the inlet manifold structure. Making the adaptor of aluminum or an aluminum alloy minimizes the mechanical problems in accomplishing that result.

Although I have shown and described certain specific embodiments of my invention, I am fully aware that many modifications thereof are possible. My invention, therefore, is not to be restricted except insofar as is necessitated by the prior art.

I claim:

1. In combination:
   an air inlet valve body formed with an internal cavity extending from an inlet to an outlet and defining a flowpath for air;
   a valve seat disposed in the cavity across said flowpath between said inlet and outlet affording communication between said inlet and outlet;
   a valve head disposed in said cavity upstream from said seat and movable into and out of engagement with said seat whereby to preclude and to permit air flow from inlet to outlet;
   resilient means comprising a spring for urging said head from said seat in a direction to permit air flow past the head and through said seat;
   actuating means responsive to suction pressure at the outlet end of said cavity for urging said head toward said seat against the bias of said spring in a degree variable with suction pressure;
   means for connecting said cavity at its outlet to the fuel and air inlet system of an internal combustion engine and to the crankcase of said engine at a point immediately downstream from the point at which fuel is mixed with air; and
   a PCV valve interconnected in series with said means for connecting said cavity to the engine crankcase; the maximum flow rate through the PCV valve being substantially twice the maximum flow rate through the air valve.

2. The invention defined in claim 1 in which said means for connecting the cavity at its outlet to PCV valve includes a non-metallic conduit, said air valve being formed of aluminum and with means in the form of external conformations and promoting heat dissipation, whereby said air valve operates at lower temperature than said PCV valve whereby to promote condensation of oil from vapors drawn to said air valve through said PCV valve.

3. In a supplemental air inlet system of the kind in which a valve body formed with a cylindrical cavity has an appertured partition extending transversely across the cavity to serve as a seat for a valve head disposed upstream from the seat on an axial pin and movable along the pin toward the seat against a bias spring surrounding the pin between the head and seat in response to suction downstream from said seat, the improvement in which:

said valve body is formed with an internal shoulder extending into said cavity and said seat rests on said shoulder; and in which said head is cylindrical and of a diameter only slightly less than the inner diameter of the cavity in which disposed and which has thickness exceeding substantially the thickness of said partition;

said head being recessed at its lower face toward said seat in a degree sufficient to receive the whole of said spring on closure of said valve.

4. The invention defined in claim 3 in which said body is fitted with a cover plate which bears against said pin and forces said seat against said shoulder.

5. The invention defined in claim 4 in which said body is formed, at a point downstream from said apperture, with two openings;

said invention further comprising a PCV valve having an output opening;

a non-metallic conduit connecting the outlet opening of the PCV valve with one of the openings of said valve body; and means in the form of a conduit connected to the other opening of said valve body for connecting said valves in parallel to an input manifold of an engine.

* * * * *